United States Patent
Solazzo

(10) Patent No.: US 9,810,138 B2
(45) Date of Patent: Nov. 7, 2017

(54) AIR CONTROL SYSTEM WITH AN INTEGRATED DIAGNOSTIC DEVICE FOR A MOTOR VEHICLE

(71) Applicant: Röchling Automotive SE & Co. KG, Mannheim (DE)

(72) Inventor: Domenico Solazzo, Worms (DE)

(73) Assignee: RÖCHLING AUTOMOTIVE SE & CO. KG, Mannheim (DE)

(*) Notice: Subject to any disclaimer, the term of this patent is extended or adjusted under 35 U.S.C. 154(b) by 251 days.

(21) Appl. No.: 14/567,166

(22) Filed: Dec. 11, 2014

(65) Prior Publication Data
US 2015/0159541 A1    Jun. 11, 2015

(30) Foreign Application Priority Data

Dec. 11, 2013    (DE) ........................ 10 2013 225 629

(51) Int. Cl.
| | | |
|---|---|---|
| *F01P 11/14* | (2006.01) | |
| *B60K 11/04* | (2006.01) | |

(Continued)

(52) U.S. Cl.
CPC ............. *F01P 11/14* (2013.01); *B60J 5/0493* (2013.01); *B60J 7/0573* (2013.01); *B60J 7/22* (2013.01);

(Continued)

(58) Field of Classification Search
CPC ....... B60K 11/085; B60K 11/08; B60K 11/04; B60J 7/22; B60J 7/0573; B60J 5/0493;

(Continued)

(56) References Cited

U.S. PATENT DOCUMENTS

| | | | | |
|---|---|---|---|---|
| 8,161,919 B2* | 4/2012 | Klotz | ................... | B60K 11/085 |
| | | | | 123/41.04 |
| 8,893,836 B2* | 11/2014 | Asano | .................. | B60K 11/085 |
| | | | | 180/68.3 |

(Continued)

FOREIGN PATENT DOCUMENTS

| | | |
|---|---|---|
| DE | 10 2005 040 290 A1 | 2/2007 |
| DE | 10 2006 028 634 A1 | 12/2007 |

(Continued)

OTHER PUBLICATIONS

German Search Report issued for German patent application No. 10 2013 225 629.9 dated Feb. 24, 2014 with machine English translation, 9 pages.

*Primary Examiner* — Peter Macchiarolo
*Assistant Examiner* — Timothy Graves
(74) *Attorney, Agent, or Firm* — Rothwell, Figg, Ernst & Manbeck, P.C.

(57) ABSTRACT

An air control system with an integrated diagnostic device for a motor vehicle includes: a carrier structure, an air output opening, a closing element arrangement with one or several closing elements adjustably placed on the carrier structure, a power unit which is constructed to adjust the closing element arrangement in an adjustment movement, a diagnostic device to acquire information about the condition of the closing element arrangement, an interface to convey data at least from the diagnostic device to another device, wherein for at least one closing element of the closing element arrangement the air control system also includes a resistance element associated with said closing element which is constructed to temporarily change the torque or force required in a predetermined phase of the adjustment movement for the adjustment of the closing element arrangement, wherein the diagnostic device acquires at least (Continued)

one operating parameter of the power unit as information about the status of the closing element arrangement.

20 Claims, 3 Drawing Sheets

(51) Int. Cl.
| | |
|---|---|
| *B60K 11/08* | (2006.01) |
| *B60J 5/04* | (2006.01) |
| *B60J 7/057* | (2006.01) |
| *B60J 7/22* | (2006.01) |
| *F01P 7/10* | (2006.01) |
| *E05F 15/41* | (2015.01) |
| *E05F 15/603* | (2015.01) |
| *E05F 15/40* | (2015.01) |
| *E05F 15/44* | (2015.01) |
| *E05F 15/695* | (2015.01) |

(52) U.S. Cl.
CPC .............. *B60K 11/04* (2013.01); *B60K 11/08* (2013.01); *B60K 11/085* (2013.01); *F01P 7/10* (2013.01); *B60Y 2306/15* (2013.01); *E05F 15/40* (2015.01); *E05F 15/41* (2015.01); *E05F 15/443* (2015.01); *E05F 15/603* (2015.01); *E05F 15/695* (2015.01); *E05Y 2400/508* (2013.01); *E05Y 2400/554* (2013.01); *Y02T 10/88* (2013.01); *Y10T 74/1892* (2015.01)

(58) Field of Classification Search
CPC ......... E05Y 2400/508; E05Y 2400/554; E05F 15/40; E05F 15/695; E05F 15/41; E05F 15/443; E05F 15/603; E05F 15/643; E05F 2015/487; F01P 7/10; F01P 11/14; F01P 7/06; F01P 7/084; Y10T 74/1892; B60H 1/00692; B60H 1/00835; B60H 1/00457; B60H 1/00678

See application file for complete search history.

(56) References Cited

U.S. PATENT DOCUMENTS

| | | | |
|---|---|---|---|
| 2007/0040463 | A1 | 2/2007 | Zorweg et al. |
| 2011/0238249 | A1* | 9/2011 | Ananthakrishna ...... B60L 11/14 701/22 |
| 2012/0097464 | A1 | 4/2012 | Waugh |
| 2012/0305818 | A1* | 12/2012 | Charnesky ........... B60K 11/085 251/212 |
| 2015/0088400 | A1* | 3/2015 | Buhler ................. B60K 11/085 701/102 |
| 2015/0149043 | A1* | 5/2015 | Macfarlane ............... F01P 7/12 701/49 |

FOREIGN PATENT DOCUMENTS

| | | |
|---|---|---|
| DE | 10 2011 116 394 A1 | 4/2012 |
| DE | 10 2012 103 464 A1 | 10/2013 |

\* cited by examiner

AIR CONTROL SYSTEM WITH AN INTEGRATED DIAGNOSTIC DEVICE FOR A MOTOR VEHICLE

CROSS REFERENCE TO RELATED APPLICATION(S)

This application claims priority to German Application No. 10 2013 225 629.9, filed Dec. 11, 2013. The entirety of the disclosure of the above-referenced application is incorporated herein by reference.

BACKGROUND OF THE INVENTION

Field of the Invention

The present invention relates to an air control system with an integrated diagnostic element for a motor vehicle, including a carrier structure; an air output opening; a closing element arrangement adjustably mounted on the carrier structure for variation of the flow cross-section of the air output opening at least between a closed position and an open position with one or several closing elements; a power unit that is constructed to adjust the closing element arrangement in an adjusting motion at least between the closed position and the open position; a diagnostic device that is constructed to acquire information about the status of the closing element arrangement; and an interface to convey data at least from the diagnostic device to an additional device that can be an external device provided in the vehicle, but also an internal device itself belonging to the air control system.

Description of the Related Art

A generic air control system is disclosed for example in the German patents DE 10 2011 116 394 A1 and DE 10 2006 028 634 A1.

Diagnostic systems (known as On-Board Diagnostic Systems, abbreviated OBD Systems) are widely used in vehicles in order to continuously monitor the operation of various control devices, especially such systems that influence the exhaust emissions of the vehicle.

Air control systems regulate the operating temperature of various component parts of a vehicle, in particular the engine. Their functional efficiency is relevant both for the operational dependability as well as fuel consumption and exhaust behavior of the vehicle.

Thus air control systems with an integrated diagnostic device are used in the prior art, wherein the diagnostic device is constructed to provide feedback, for example to an OBD system, as to whether the air control system is working as intended.

The generic air control system described in DE 10 2011 116 394 A1 serves to control the air flow through the radiator grill opening of a vehicle and includes a closing element arrangement of several air flaps as closing elements. The adjusting movement of the air flaps is regulated via a master controller, wherein a subordinate processor functions as a diagnostic device and provides feedback to the master controller about the current status of the air flaps, such as whether they have opened or closed.

In order to produce such feedback, sensors are used in the prior art, in the case of pivoting air flaps Hall sensors or potentiometers, as known from DE 10 2006 028 634 A1.

Such sensors require construction space, must be supplied with energy, and increase the assembly cost as well as the susceptibility to failure and, not least, increase the cost of the air control system.

This is especially relevant when the closing element arrangement includes several closing elements moving together via a connection structure.

During vehicle operation, it can happen that the coupling in a closing element separates from the connection structure, for example by material breakage, when the adjusting movement of a closing element is blocked, for example by a foreign object in the air control system.

In order to check whether such an air control system is functioning properly, namely whether all air flaps displace according to the control commands, it is not sufficient to check the position of the power unit, but moreover the status of each individual air flap must be acquired by a special sensor, which for the reasons previously stated, makes the air control system technically complicated, prone to error, and expensive

SUMMARY OF THE INVENTION

Against this background of the prior art, the object of this invention is to simplify the air control system known from the prior art and thereby ensure reliable verification of its functional capability.

The object is inventively achieved in that the generic air control system further encompasses, for at least one closing element of the closing element arrangement, a resistance element associated with said closing element that is constructed to generally change, usually increase, the torque required to adjust the closing element arrangement, or a force required thereto, in a predetermined phase of the adjustment movement because of the reciprocal effect between the closing element and the associated resistance element, wherein the diagnostic device is constructed so as to acquire at least one operational parameter of the power unit as information concerning the status of the closing element arrangement.

The temporary change of the torque required for the adjustment movement or the force required thereto can be reflected in various ways in its operating parameters, depending on how the power unit is controlled or regulated with a direct-current motor regulated at a constant speed, approximately in a temporary change of the current consumption. By acquisition of a suitable operating parameter of the power unit, conclusions can also be made about the torque required or the force required.

The acquisition of an expected temporary change of the torque or the force can be evaluated by the diagnostic device in a certain phase of the adjustment movement as a sign that the closing element in question, which is influenced in this phase by the associated resistance element, performs the desired adjustment movement and thus functions properly.

If the change of the torque or force expected in a certain phase does not occur, then it can be concluded that either the associated closing element did not execute the adjustment movement, or the corresponding resistance element is defective (such as broken off). In this case an error signal can be produced, such as a warning light on the dashboard of the vehicle coming on, in order to prompt a check of the air control system by the driver or a workshop.

With regard to the resistance element, it can involve a structurally simple, passive component part that is low in cost to manufacture and assemble and need not be supplied with energy, so that signal and supply lines leading to the resistance element are unnecessary and the structure of the air control system can be definitely simplified.

When the closing element arrangement encompasses several closing elements, then the air control system preferably includes, for each closing element of the closing element arrangement, a resistance element associated only with that closing element, wherein the resistance elements are constructed to temporarily change the torque required for adjusting the closing element arrangement or the force required therefor in respectively different, predetermined phases of the adjusting movement.

In this manner, when the diagnostic device acquires the different temporary changes of the torque, or the absence of such change, it can be determined whether all closing elements are functioning properly and a defective closing element can be identified based on the phase of the adjusting movement in which the normally expected change in the torque or force is absent.

An especially simple differentiation of the various closing elements can be guaranteed in that the different predetermined phases are disjunctive in pairs.

Additionally or alternatively, to achieve the same object, resistance elements associated with different closing elements can change in a different manner the torque or the force to be applied in the particular phases.

The inventive air control system then advantageously allows in particular that several, preferably all, closing elements of the closing element arrangement are coupled via a connection structure, such as a connection web, for a common adjustment movement, and the power unit encompasses a single drive coupled to the connection structure.

In this case the air control system itself can check by monitoring the operating parameter of the power unit, whether all closing elements are still coupled with the connection structure, and can also identify, if applicable, a defective closing element without each individual closing element having to be monitored with a separate sensor.

The drive can hereby be coupled directly to the connection structure to convey movement, but it can also be directly coupled to one of the closing elements, wherein the coupling of the various closing elements then occurs via the connection web.

Also not to be excluded is the fact that the closing element arrangement includes several groups of closing elements, wherein the closing elements of each group are coupled for a common adjusting movement and the power unit for each group includes a separate drive. In this case, a suitable operating parameter of each drive is preferably acquired by the diagnostic device.

It can also be possible to position the resistance elements such that the last of the predetermined phases of the adjusting movement from the open position to the closed position begins in the last half, preferably in the last quarter, of the duration of the entire adjusting movement from the open position to the closed position.

The appearance of the expected temporary change of the torque or the force in the last predetermined phase can thus be used as an indication that the closing element arrangement will soon reach the closed position.

In reaction thereto, the rotational speed of a motor functioning as the power unit can be reduced, for example. Then, in particular when the air control system has a limiting stop in the closed position, a soft, controlled approach to the closed position is achieved and power and limits are preserved.

Alternatively or additionally, the last of the predetermined phases of the adjusting movement from the closed position to the open position can begin accordingly in the last half, preferably in the last quarter, of the duration of the entire adjusting movement from the closed position to the open position.

The resistance elements can be realized with an especially simple construction in that the resistance element or each of several, preferably each of the resistance elements, is constructed from an elastic material, preferably rubber, in the form of a protrusion extending into the adjustment path of the associated closing element.

During its adjustment movement, the closing element temporarily elastically moves the associated resistance element in a phase of the adjustment movement predetermined by the positions of the resistance element, whereupon the required torque or the required force for the adjustment of the closing element arrangement is temporarily increased in this phase. The extent of this temporary torque or force increase can be influenced by the material, shape, and size of the protrusions.

Basically, however, other embodiments of the resistance elements, such as spring elements, should not be ruled out.

In order to avoid unwanted air turbulence and, not least, to not detract from the overall visual impression of the air control systems, especially when used in the radiator grill area, the resistance element or each of several resistance elements, preferably each of the resistance elements, can be so positioned that it is not visible at least in the closed position of the closing element arrangement when viewing the air control system in an inflow direction during the operating state of the air control system built into a vehicle, for example by being covered with the associated closing element or the carrier structure.

A direct-current motor, for example, can be used as a power unit, in particular a brushless direct-current motor (BLDC motor), preferably a permanently charged BLDC motor which is preferably regulated without sensors (for example via a counter electromotive force).

Hereby the diagnostic device can acquire the current consumption, for example, the strength of the armature current, as the operating parameter of the drive unit.

Basically, not to be ruled out is the fact that the diagnostic device constantly provides the current value of the acquired operating parameter to the interface.

To relieve the burden on a central monitoring system (such as an OBD system), the diagnostic device can be constructed such that the operating parameter of the power unit is to be acquired as a function of time, and to derive from the profile of this function information about the status of the closing element arrangement, in particular the status of the individual closing elements, and to convey this to the interface.)

To this end, an appropriately programmed circuit can be provided on the diagnostic device. For example, it is possible that the diagnostic device releases a signal to the interface upon a query or at regular time intervals or at certain events (such as turning on the spark ignition in a speed range, for example, of 0-40 km/hr), said signal furnishes information about whether the closing elements are functioning and, if applicable, which of the closing elements are not functioning.

According to an especially preferred embodiment, the interface is constructed such that it cooperates with an OBD system of the vehicle. To this end, the interface must be adapted to the standards applicable for the OBD system.

BRIEF DESCRIPTION OF THE DRAWING FIGURES

In the following section, the previously discussed invention will be explained in more detail using selected embodiments which are explained in the attached figures.

FIG. 1 shows in partial depictions a), b), and c) different views of the first embodiment of an inventive air control system, wherein partial depiction a) shows an overhead view of the back side of the air control system, partial depiction b) shows a cutaway view of the object of partial depiction a) in the cut plane designated there with B-B, and partial depiction c) is a cutaway view of the object of partial depiction a) in the cut plane designated there with C-C.

Figure 1:
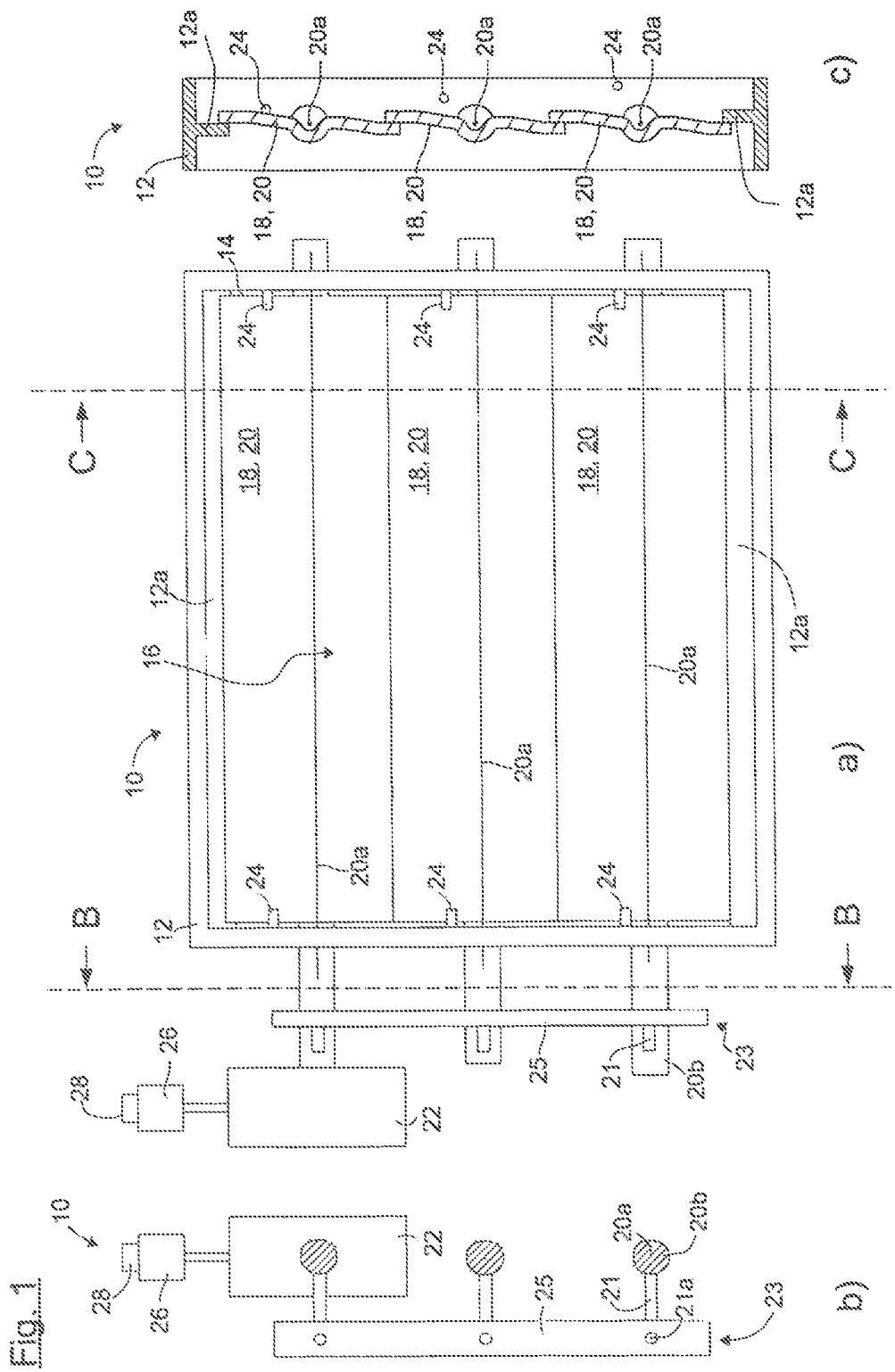

All figures involve extremely simplified schematic drawings which are to illustrate the principle of the invention and in particular are not to be understood as in scale. In order not to make the figures too busy, not all component parts are provided with reference designations, especially when the depicted object includes several similar component parts.

DETAILED DESCRIPTION OF THE PREFERRED EMBODIMENTS

FIG. 1a) shows a view of the back side of a first embodiment of an inventive air control system 10.

The front side opposite the depicted back side is thereby that side of the air control system with inlet air flow during the operation of the vehicle, if the air control system 10 is built into the vehicle. When inserted into a radiator grill, the back side depicted in FIG. 1a) is that side which in a built-in state faces the interior of a vehicle, which is not shown in the figures.

The air control system 10 encompasses, as FIG. 1a) shows, a carrier structure 12 and an air output opening 14 whose flow cross-section can be varied by an adjustable closing element arrangement 16 positioned on the carrier structure 12.

In the example shown, this includes three closing elements 18, which here involves air flaps 20 that can be mounted to pivot around the flap axis 20a on the carrier structure 12.

The adjustment movement of the closing elements 18 is powered by an actuator as a power unit 22 which is only schematically depicted here and which can be constructed, for example, as a sensor-free BLDC motor regulated at a certain rotational speed (e.g. 2400 rpm).

A non-depicted gear box between the drive shaft of the motor and the closing element 18 (here the topmost air flap 20) coupled thereto can also be provided to produce the desired adjustment movement.

A diagnostic device 26 is constructed in this example to acquire current consumption as an operating parameter of the power unit 22 and via an interface 28 can be brought into a communication connection with another device, such as a control or regulating device for the power unit 22 and/or an OBD system of the vehicle.

The closing elements 18 of the closing element arrangement 16 can be coupled together for a common adjustment movement via a connection structure 23.

As shown in the cutaway view of FIG. 1b), the connection structure 23 can include, for example, a connection web 25 on which crank elements 21 are mounted so as to rotate around respective axes 21a that run parallel to the flap axes 20a; said crank elements 21 are rotationally fixed to the axle trunnions 20b of the air flaps 20.

Essential for this invention are the resistance elements 24, which in the example shown are constructed as elastic (such as from rubber) protrusions provided in the carrier structure 12 that protrude into the air output opening 14 and into the adjustment path of the respective closing elements 18.

Thus in this case a pair of opposing protrusions is associated as a resistance element 24 with a certain closing element 18 into whose adjustment path the protrusions extend.

It is also basically possible to use only one protrusion element as a resistance element. However, in this present arrangement of air flaps 20 pivoting around their longitudinal axes, it is advantageous to provide two protrusions in the area of the two opposite longitudinal ends of the respective air flap 20, in order to avoid an undesired twisting of the air flap 20 around its longitudinal axis during operation.

The resistance elements 24 are better able to be recognized in the cutaway depiction of partial FIG. 1c). It is clearer in this view than in the overhead view from partial figure a) that the resistance elements 24 respectively protrude from different locations of the adjustment path of the associated air flap 20, so that the individual air flaps 20 successively "pass over" the associated resistance elements 24 (rubber stops), which will be explained in more detail in the following section with reference to FIGS. 2 and 3.

Figure 2:
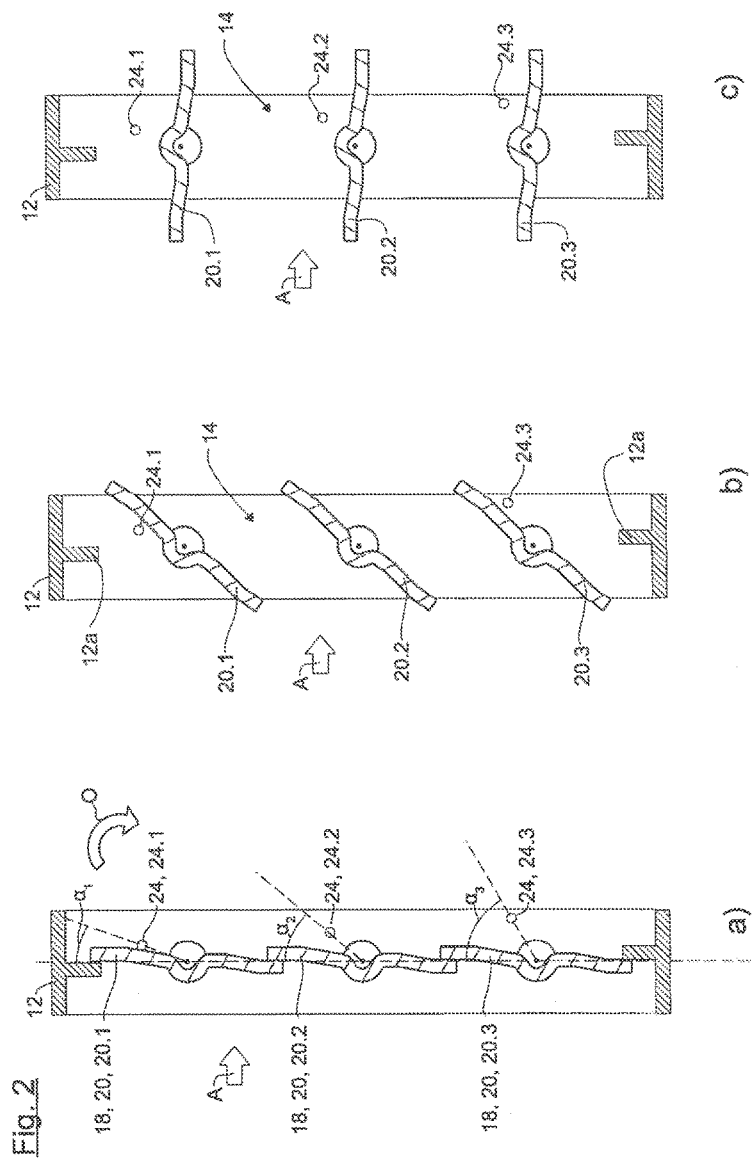
FIG. 2 shows the object of FIG. 1c) in the partial depictions a) to c) in various stages of the adjustment movement.

FIG. 2a) corresponds to FIG. 1c) wherein in FIG. 2 in addition to the reference designations used in FIG. 1, the upper air flap 20.1, the middle air flap 20.2, and the lower air flap 20.3 as well as the associated resistance elements 24.1, 24.2, 24.3 are differentiated by their additional reference designations.

Furthermore, the adjustment angles $\alpha_4$, $\alpha_2$, and $\alpha_3$ are also entered into FIG. 2a), at which the closing elements 18 reach the respective associated resistance elements 24. The reference system is thereby selected such that the adjustment angle of 0° corresponds to the closed position shown in partial depiction a), an adjustment angle of about 90° in a clockwise direction (opening direction O) from the closed position, corresponds to the open position shown in partial depiction c). In the closed position at least some of the closing elements 18 can rest on the end stops 12a which are provided on the carrier structure 12 in this example.

As shown in FIG. 2a), the resistance elements 24 are so positioned on the carrier structure 12 that the uppermost of the depicted air flaps 20.1 in this example reaches the associated resistance element 24.1 at an adjustment angle $\alpha_1$ of about 20° from the closed position shown in Figure a). The middle air flap 20.2 reaches the associated resistance element 24.2 (which cannot be seen in partial depiction b) at an adjustment angle $\alpha_2$ of about 40°, and the lowest air flap 20.3 reaches the associated resistance element 24.3 at an adjustment angle $\alpha_3$ of about 60°.

The resistance elements 24 are preferably so elastic that they basically do not impede the adjustment movement but instead, because of their temporary elastic deflection, only cause a slight temporary increase of the torque to be applied by the power unit 22 (for example by about 0.1 Nm) because of the associated closing elements.

This is shown in a local maximum of current consumption (current pulse) of the power unit 22 which is acquired by the diagnostic device 26 and can be sent onward to the interface 28 for a data exchange with another device, such as an external control device, in particular an OBD system of the vehicle.

Figure 3:
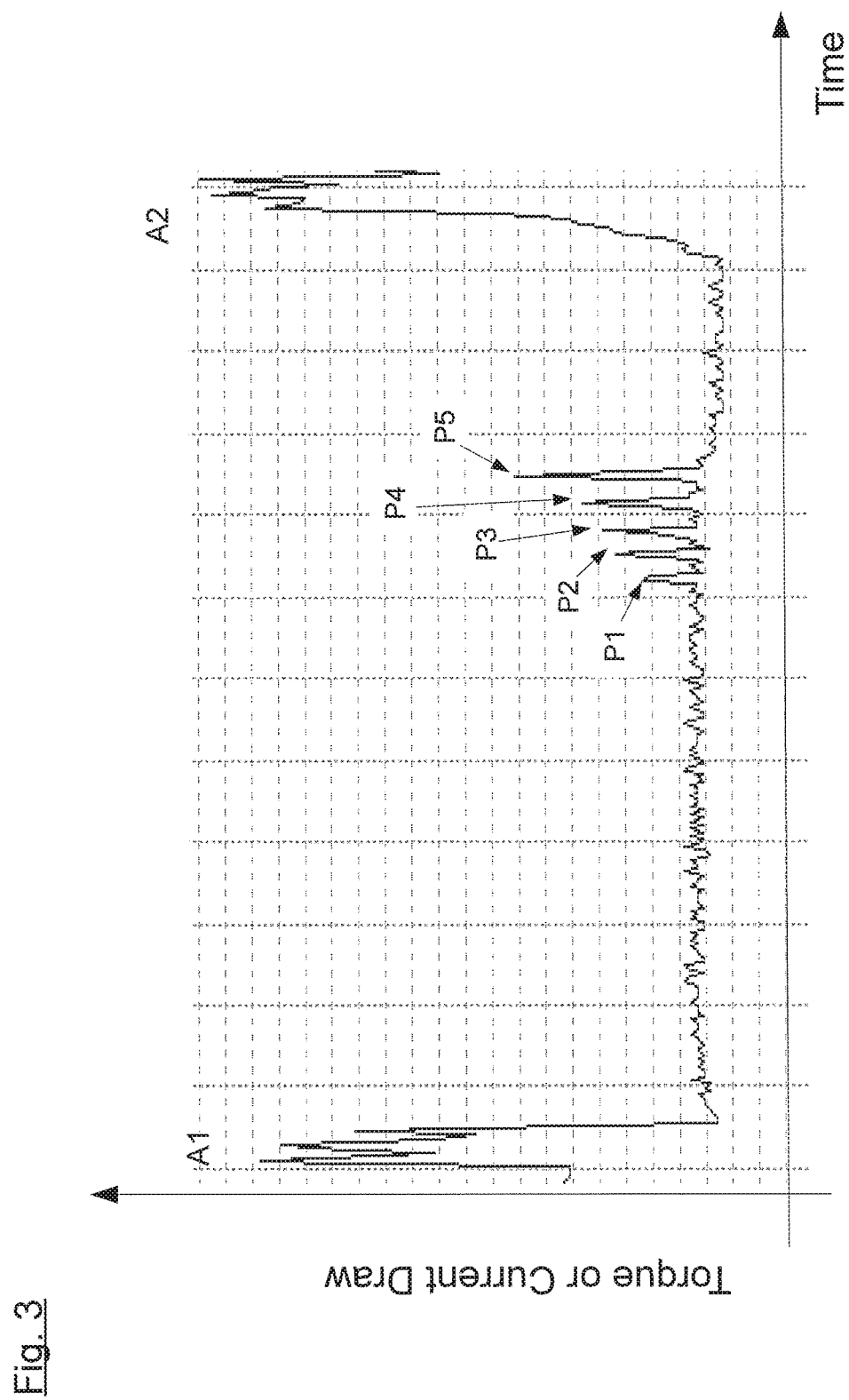
FIG. 3 shows the torque or the current consumption of the power unit as a function of time for another embodiment of an inventive air control system with five closing elements.

FIG. 3 shows another embodiment which can be constructed similar to the first embodiment shown in FIGS. 1 and 2, but in contrast thereto encompasses five closing elements and the torque and current consumption of the power unit are a function of the time for an adjustment movement into the open position (also corresponding to a sequence of the partial depictions 2c)→2b)→2a)).

Next, an increased torque is required in an initial area A1 beginning from the closed position, so that the direct current motor used as a power unit can operate at a minimum rotational speed.

Thereafter, the torque decreases and remains basically constant until the first closing element reaches the associated resistance element, which is expressed as a local maximum P1 of the function shown in FIG. 3.

Local maxima P1 to P5 are associated with all five air flaps, which in this example are approximately equidistant and increase in value monotonously.

A value of the change in torque for various closing elements different from that shown in FIG. 3 can be useful when a different value or thickness of the respective, associated resistance elements is used in order to be able to differentiate the various closing elements from each other.

At the end of the adjustment movement, approximately when the closing elements each move to the end stops (such as the end stops 12a of the embodiment from FIG. 2), the torque again increases in area A2.

The recognition of the last maximum P5 can be used to control downward the rotational speed of the power unit and as a result facilitate a soft approach to the end stops, in order to conserve the stops and power.

The inventive air control system enables in a very simple manner reception of feedback about the functional capability of the closing element arrangement, in particular the individual closing elements. Especially in the case of several closing elements, each individual closing element can be identified and differentiated without a separate sensor having to be provided for each closing element.

The invention claimed is:

1. An air control system with an integrated diagnostic device for a motor vehicle, comprising:
   a carrier structure;
   an air output opening;
   a closing element arrangement with one or several closing elements adjustably placed on the carrier structure for a variation of the flow cross-section of the air output opening at least between a closed position and an open position;
   a power unit which is constructed to adjust the closing element arrangement in an adjustment movement at least between the closed position and the open position;
   a diagnostic device which is constructed to acquire information about the status of the closing element arrangement;
   an interface to convey data at least from the diagnostic device to another device;
   wherein for at least one closing element of the closing element arrangement the air control system also includes a resistance element associated with said closing element, said resistance element being constructed to temporarily increase the torque or force required by the power unit to move the closing element arrangement past the position of the associated resistance element towards the closed or the open position, because of the reciprocal effect between the closing element and the associated resistance element,
   wherein the diagnostic device is constructed to acquire at least one operating parameter of the power unit as information about the status of the closing element arrangement.

2. The air control system according to claim 1, wherein the closing element arrangement includes several closing elements and the air control system also includes for each closing element of the closing element arrangement a resistance element only associated with that closing element, wherein the resistance elements are constructed to temporarily change the torque or the force required for adjustment of the closing element arrangement in various predetermined phases of the adjustment movement.

3. The air control system according to claim 2, wherein the resistance elements are constructed to temporarily change the torque or force required for the adjustment of the closing element arrangement in respective various and predetermined, in pairs disjunctive and paired phases of the adjustment movement.

4. The air control system according to claim 2, wherein several, closing elements of the closing element arrangement are coupled for a common adjustment movement via a connection structure and the power unit includes an individual actuator coupled to the connection structure.

5. The air control system according to claim 1, wherein the last of the predetermined phases of the adjustment movement from the open position to the closed position begins in the last half of the duration of the overall adjustment movement from the open position to the closed position.

6. The air control system according to claim 1, wherein the resistance element is constructed in the form of a protrusion of an elastic material, extending into the adjustment path of the associated closing element.

7. The air control system according to claim 1, wherein the resistance element is positioned such that it is not visible at least in the closed position of the closing element arrangement when viewing the air control system in an inflow direction in the operating state of the air control system built into the vehicle.

8. The air control system according to claim 1, wherein the power unit comprises a direct current motor or is constructed as such.

9. The air control system according to claim 1, wherein the diagnostic device is constructed to acquire current consumption as the operating parameter of the power unit.

10. The air control system according to claim 9, wherein the diagnostic device is constructed to acquire the operating parameter of the power unit as a function of time and to derive information about the status of the closing element arrangement, and convey it to the interface.

11. The air control system according to claim 1, wherein the interface is constructed to interact with an OBD system of the vehicle.

12. The air control system according to claim 4, wherein all closing elements are coupled for a common adjustment movement via the connection structure.

13. The air control system according to claim 4, wherein the connection structure includes a connection web.

14. The air control system according to claim 5, wherein the last of the predetermined phases of the adjustment movement from the open position to the closed position begins in the last quarter of the duration of the overall adjustment movement from the open position to the closed position.

15. The air control system according to claim 6, wherein the elastic material is rubber.

16. The air control system according to claim 8, wherein the motor is a BLDC motor.

17. The air control system according to claim 15, wherein the BLDC motor is permanently charged.

18. The air control system according to claim 16, wherein the BLDC motor is regulated without sensors.

19. The air control system according to claim 10, wherein the information derived includes the status of the individual closing elements from the progression of the function.

20. The air control system according to claim 8, wherein the diagnostic device is constructed to acquire current consumption as the operating parameter of the power unit.

* * * * *